_US005254240A_

United States Patent [19]
Galiasso et al.

[11] Patent Number: 5,254,240
[45] Date of Patent: Oct. 19, 1993

[54] HYDROCRACKING OF PETROLEUM FEEDSTOCKS USING A TRI-ELEMENTAL CATALYST WITH A TITANIA-ALUMINA SUPPORT

[75] Inventors: Roberto E. Galiasso; Mary Palma; Edilberto Rodriguez; Fernando Gonzalez, all of Los Teques; Ricardo Prada, Caracas, all of Venezuela

[73] Assignee: Intevep, S.A., Venezuela

[21] Appl. No.: 837,806

[22] Filed: Feb. 18, 1992

Related U.S. Application Data

[63] Continuation-in-part of Ser. No. 697,118, May 8, 1991.

[51] Int. Cl.$^5$ .................. C10G 47/04; C10G 45/00
[52] U.S. Cl. ..................... 208/112; 208/143
[58] Field of Search ............. 208/112, 143; 502/326, 502/351

[56] References Cited

U.S. PATENT DOCUMENTS

| | | | |
|---|---|---|---|
| 2,897,135 | 7/1959 | Doumani | 208/112 |
| 2,946,739 | 7/1960 | Gardner et al. | 208/112 |
| 3,306,839 | 2/1967 | Vaell | 208/59 |
| 4,465,790 | 8/1984 | Quayle | 502/309 |
| 4,581,126 | 4/1986 | Day et al. | 208/138 |

Primary Examiner—Theodore Morris
Assistant Examiner—Walter D. Griffin
Attorney, Agent, or Firm—Dressler, Goldsmith, Shore, Sutker & Milnamow, Ltd.

[57] ABSTRACT

A tri-elemental catalyst suitable for hydrocracking and hydrogenation of aromatics-containing petroleum hydrocarbon feedstocks such as hydrotreated cracked feedstock, virgin feedstock, vacuum distillate, middle distillate, mixtures thereof, and the like, is disclosed. The catalyst is suitable for hydrodesulfurization as well as hydrodenitrogenation, thus the feedstock can contain sulfur and nitrogen in addition to the aromatic components. Hydrocracking and aromatics hydrogenation of the petroleum hydrocarbon feedstocks is accomplished under a relatively wide range of process conditions using the tri-elemental catalyst that contains a catalytically active metal phase constituted by a Group VI-B element, a Group VIII first transition series element and a Group VIII second transition series element, all supported on a titania-alumina support containing about 5% to about 30% by weight titania in the support.

10 Claims, 4 Drawing Sheets

HYDROCRACKING OF PETROLEUM FEEDSTOCKS USING A TRI-ELEMENTAL CATALYST WITH A TITANIA-ALUMINA SUPPORT

CROSS-REFERENCE TO RELATED APPLICATION

This application is a continuation-in-part of co-pending U.S. Ser. No. 07/697,118, filed on May 8, 1991.

TECHNICAL FIELD

This invention relates to the uses of a catalyst in hydrocracking processes for cracked and virgin (straight run) petroleum distillates and residues.

BACKGROUND OF THE INVENTION

Catalytic hydrocracking process is a petroleum refining operation which converts heavy distillation fractions or residues of virgin and cracked petroleum distillates into middle distillates.

In the first step of the reaction, the feedstock, which contains polycyclic aromatics, is solely hydrogenated, after which hydrocracking takes place together with further hydrogenation. In the hydrocracking process that follows, the polycyclic aromatics are hydrocracked to monocyclic aromatics as well as to paraffins. During the hydrocracking process, organic nitrogen and sulfur compounds are converted into ammonia and hydrogen sulfide, respectively, to yield sweetened products.

In a typical hydrocracking process, the petroleum feedstock is brought into contact with a catalyst which has both a hydrogenation function and an acidic function. The hydrogenation function is provided by a combination of metals such as nickel-tungsten, nickel-molybdenum, cobalt-molybdenum, and the use of noble metals such as platinum, palladium, osmium, etc. The acidic function is provided by the catalytic support or substrate which consists, generally, of alumina modified by additives that improve the surface acidity of the catalyst, such as silicon, phosphorus, boron, fluorine, magnesium, titanium, zirconium, etc.

In order to obtain specific products, a considerable effort has been made to develop and commercialize highly active and selective catalysts for hydroconversion of heavy distillation fractions and residues into middle distillates and for the saturation of aromatic compounds contained in these fractions.

For example, U.S. Pat. No. 3,016,346 to O'Hara describes a nickel-molybdenum catalyst supported on alumina and a smaller amount of titania (0.5 to 5.0% by weight). The catalyst contains about 5% to about 10% by weight of molybdenum, about 0.% to about 0.7% by weight cobalt and about 1% to about 5% by weight nickel, based on the weight of the finished catalyst. The catalyst has hydrodenitrogenation activity and also inhibits those hydrocracking reactions which result in excessive coke deposits on the catalysts when the catalyst is used for hydrotreating a thermally cracked middle fraction in a standard relative activity test. The alumina-titania support in O'Hara is prepared by co-precipitation of aluminum and titanium hydroxides from a solution of titanium tetrachloride, an aqueous ammonium hydroxide solution and aluminum chloride, and contains 3.7% by weight of titanium.

U.S. Pat. No. 4,465,790 to Quayle discloses a hydrodenitrogenation catalyst comprising catalytic molybdenum and nickel on a co-precipitated support of alumina and titania. The support is co-precipitated from solutions of the sulfates of aluminum and titanium. Titania in the support constitutes more than 5% by weight of the catalyst. The resulting hydrogel is processed using standard techniques to form a catalyst support. Catalytic metals are then impregnated onto the support. The molybdenum loading on the catalyst is between 10% and 25% by weight (as $MoO_3$) and the nickel loading is from 2% to 10% by weight (as $NiO$). However, this particular catalyst has relatively poor mechanical properties and is difficult to extrude during manufacture.

U.S. Pat. No. 5,009,768 to Galiasso et al. describes a hydrocracking process that requires two or more hydrotreatment stages followed by hydrocracking using a catalyst bed of a particular composition for the mild hydrocracking stage.

European Patent Application 0 199 399 discloses a method for making a hydrocarbon conversion catalyst with improved hydrodesulfurization and hydrodenitrogenation activity. The catalyst contains a Group VI-B metal that is either molybdenum or tungsten and a Group VIII metal that is either cobalt or nickel that are incorporated into a titania-containing alumina support. The catalyst is prepared by mulling together alpha aluminum monohydrate and titanium dioxide at a molar ratio of $Al_2O_3:TiO_2$ ranging from 3:1 to 5:1, acetic acid in a concentration ranging from 2.5 to 3.5 parts of acid per 100 parts of $Al_2O_3$ by weight, and sufficient water to produce an extrudable mixture. The mixture is then extruded and calcined. The metals are impregnated onto the support by conventional methods.

SUMMARY OF THE INVENTION

Tri-elemental catalyst having three catalytically active metals supported on a titania-alumina support are used under specific operating conditions to hydrocrack and hydrogenate petroleum hydrocarbon feedstock having a relatively high aromatic content. The catalyst is contacted with the petroleum hydrocarbon feedstock in a reactor under hydrocracking conditions and while at least about 60 volume percent, of the reactor void volume is occupied by a gaseous mixture of hydrogen and vaporized feedstock so as to produce a product having a reduced aromatic content, usually less than about 20 percent by volume.

It has been found that the maintenance of a certain hydrocarbon vapor loading in the hydrocracking reactor or reactors while minimizing the internal liquid hold up in the reactor substantially increases the yield and quality of the desired middle distillates, e.g., diesel fuel and/or jet fuel, when using the trimetallic catalysts described hereinbelow. In addition, the present process can utilize feedstocks having a much higher sulphur and nitrogen content in the hydrocracking stage than those of previous art.

DETAILED DESCRIPTION OF PREFERRED EMBODIMENTS

Figure 1:
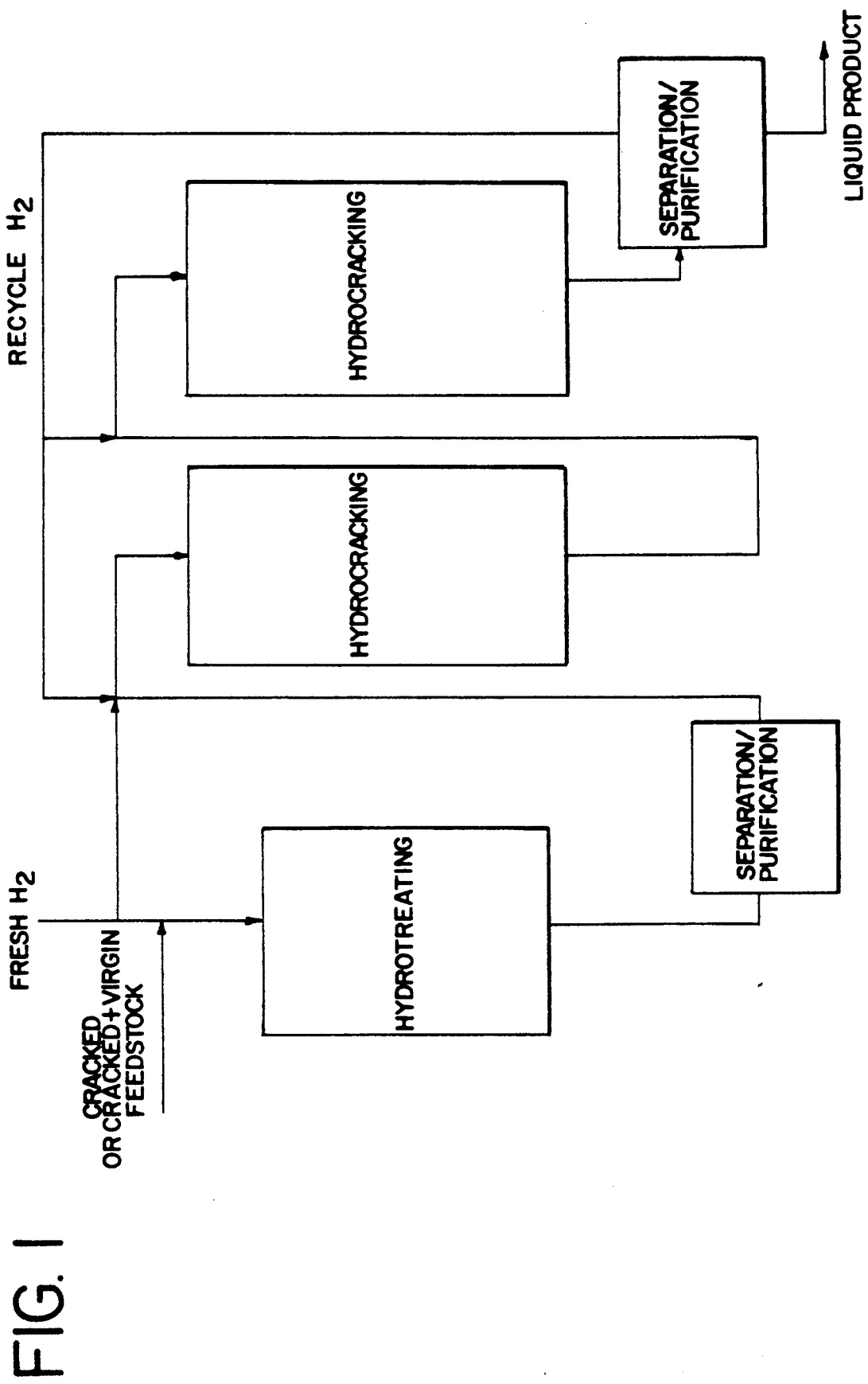
FIG. 1 is a flow diagram showing the overall process of the invention.

The present invention is a hydrocracking and deep hydrogenation process that utilizes a unique catalyst having three catalytically active elements on a special support for processing feedstocks relatively high in aromatics.

The feedstocks particularly well suited for the present process are the relatively high boiling feedstocks of petroleum hydrocarbon origin, typically cracked, and cracked plus virgin feedstocks, such as heavy and light gas oils, and a mixture of heavy gas oils and vacuum bottoms, all having a relatively high aromatic content. These feedstocks, preferably after hydrotreating, can be readily converted to high quality lower boiling products such as diesel fuel, jet fuel, and the like, in good yields and having a relatively lower aromatic content. Relatively small amounts of gasoline and gases are formed during the process. For high quality diesel fuel and jet fuel production, it is preferred that the feedstock is first subjected to a hydrotreatment that reduces the metal content as well as the sulfur and nitrogen contents thereof. For that purpose, specialized hydrotreatment processes can be utilized. It is particularly preferred to use the demetalization, hydrodenitrogenation, and hydrodesulfurization processes described in commonly owned U.S. Pat. No. 5,009,768 to Galiasso et al. for such treatments.

The preferred petroleum hydrocarbon feedstock has a boiling end point above about 400° F. (about 205° C.) and higher, usually above about 600° F. (about 315° C.), as well as a relatively low sulfur content (about 3000 ppm or less) and nitrogen content (about 600 ppm or less). The boiling characteristics of the particular feedstock are flexible. For the production of middle distillates such as diesel fuel and jet fuel, the feedstock can include light as well as heavy fractions, and the hydrocracking/hydrogenation functions are adjusted with operating conditions. Thus, especially for jet fuel production, catalytically or thermally cracked gas oils, e.g., light cycle oil and heavy cycle oil, are particularly well suited as a feedstock for the presently contemplated process. The cycle oils from catalytic cracking processes typically have a boiling range of about 400° F. to about 1050° F. (about 205° C. to about 5300° C.). Typical aromatic content is in the range of 50 to 80% by weight.

The catalyst support is made of alumina and titania, and is manufactured by co-precipitation as a hydrogel of an aqueous titanyl ($TiO^{2+}$) salt solution combined with an aluminum sulfate solution Co-precipitation is effected by the addition of a sodium aluminate solution. Illustrative of such titanyl salt solutions are the titanyl halide, e.g., titanyl chloride ($TiOCl_2$), and titanyl sulfate ($TiOSO_4$) solutions. Preferably, a Group VI-B transition element of the second or third transition series, namely molybdenum (Mo) or tungsten (W) is present together with a Group VIII transition element of the first transition series, namely cobalt (Co), nickel (Ni) or iron (Fe), and a Group VIII transition element of the second transition series, namely ruthenium (Ru), rhodium (Rh) or palladium (Pd), as the three catalytically active elements on the porous alumina and titania support.

It has been found that by utilizing a titanyl ($TiO^{2+}$) salt to prepare the catalytic support, sulfates can be more readily removed during washing of the produced hydrogel. In addition, the use of a titanyl salt permits more efficient extrusion of the catalyst support and provides enhanced texture as well as enhanced surface acidity for the catalyst support. Suitable titanyl salt solutions can be readily obtained upon hydrolysis of titanium tetrachloride or titanium trichloride.

The amount of titania in the produced catalyst support is about 5% to about 30% by weight, preferably about 6% to about 15% by weight, of the catalyst support. By preparing the support in this manner, the titanium and the aluminum ions are more intimately intermixed throughout the support which facilitates substitution of the metals for each other in the support matrix. This, in turn, makes the support more acidic. An optimum support surface acidity is achieved when the molar ratio of titanium to aluminum in the support is about 1:9.

The precipitated alumina and titania hydrogels are spray dried, and the resulting dried powders are then blended in the presence of an aqueous organic acid such as acetic acid. If desired, an aqueous inorganic acid, such as nitric acid, can also be used. An aqueous acid solution that has an acetic acid concentration of about 0.35M to about 0.5M (about 2% to about 3% acetic acid by volume) is preferred. The powder and solution are blended into a paste and extruded. The extruded paste is dried at a temperature of about 30° C. to about 80° C., preferably about 60° C., for about 2 hours and at a temperature of 60° C. to about 150° C., preferably about 120° C., for 3 hours. The dried support is then calcined at a temperature of about 300° C. to about 400° C., preferably about 350° C., for 2 hours, and at a temperature of 450° C. to about 600° C., preferably about 550° C., for about 3 hours.

The prepared catalyst support has a surface area in the range of about 130 m²/g to about 300 m²/g, preferably about 140 m²/g to about 250 m²/g. The pore volume of this catalyst support is in the range of about 0.4 cm³/g to about 0.8 cm³/g, preferably about 0.45 cm³/g to about 0.65 cm³/g. The pore size range in the catalyst support is about 20Å to about 500Å in diameter. At least about 95% of the total pore volume falls within this range.

The surface area and distribution of the pores in a representative catalytic support of the present invention was determined using the nitrogen Brunauer-Emmett-Teller (B-E-T) method described in Brunauer et al., J. Am. Chem. Soc. 60:309 (1938). The results are provided in Table I below:

TABLE I

Typical Pore Diameter Distribution In The Catalytic Support

| Average Pore Diameter | % Distribution |
|---|---|
| <30 | 5 |
| 30 to <60 | 27.1 |
| 60 to <90 | 28.4 |
| 90 to <150 | 25 |
| 150 to <300 | 6 |
| 300 to 600 | 6 |
| >600 | 2.5 |

The extruded catalyst support spheres or pellets are preferably about 0.25 cm to about 0.08 cm in diameter. The extruded particles are approximately 2.5 to about 4 mm long. The structural strength (bed strength) of the catalyst is about 7 kg/cm$^2$ to about 20 kg/cm$^2$.

The three metal moieties that constitute the catalytically active phase are loaded onto the catalyst support in a two or three step procedure. Initially, a Group VI-B element is impregnated onto the support. The Group VI-B element is preferably impregnated onto the support in the form of a metal salt solution, preferably a tungsten or molybdenum salt, with a metal concentration sufficient to provide a concentration of about 6% to about 30%, preferably about 12% to about 30% of the VI-B metal (expressed as weight of the corresponding metal oxide) by weight of the catalyst. In a preferred embodiment, the impregnating solution is buffered at a pH of about 4 to about 6. The impregnated catalyst is dried at a temperature of about 30° C. to about 150° C., preferably in two steps, 60° C. for 2 hours and 120° C. for 3 hours. In some cases, the catalyst is additionally calcined first at a temperature of about 300° C. to 400° C. for about 2 hours and then at about 450° C. to about 550° C. for about 3 hours. The impregnated support is then further co-impregnated with a solution of a Group VIII (first transition series) element, i.e. cobalt, nickel or iron, preferably cobalt or nickel, and a Group VIII second transition series element, i.e., ruthenium (Ru), rhodium (Rh) or palladium (Pd), preferably Ru or Pd. Preferably about 2% to about 10% by weight of the Group VIII element (first transition series), expressed as the weight of the corresponding oxide and based on the weight of the catalyst, is loaded onto the support. The Group VIII second transition series element is loaded onto the support in an amount of about 0.01% to about 1% by weight based on total catalyst weight. The impregnating solution is preferably buffered at a pH of about 4 to about 6. In a preferred impregnating solution the NiO concentration is about 40 to about 160 g/l and the Ru concentration is about 1 to about 12 g/l. The further impregnated catalyst is dried at a temperature of about 30° C., to about 150° C., preferably 60°-120° C., for about 3 hours, and calcined at a temperature of about 300° C. to about 400° C. for about 2 hours and at about 450° C. to about 500° C. for about 3 hours.

In an alternative method of preparation (Example 2), the impregnated (Group VI-B) and dried support is impregnated, dried and calcined in a second stage with a solution of Group VIII (first transition series) element at solution and operating conditions the same as those in the previously described procedure, and then impregnated, dried and calcined with a Group VIII (second transition series) element in a third stage at solution, drying and calcining conditions the same as those in the previous stages.

This particular combination of preferred metals loaded onto the titania/alumina support described herein provides a metal dispersion on the catalyst support that enhances the hydrogenating function of the catalyst. This particular combination of metals also enhances the activity of the Group VIII (first transition series)/Group VI-B system, which saturates carbon-to-carbon double bonds in the feedstock aromatics and provides resistance to catalyst deactivation by the buildup of coke deposits. The Group VIII (first transition series)/Group VI-B system offers enhanced hydrogenation capacity due to the presence of the Group VIII (second transition series) element.

By utilizing the aforesaid double or triple impregnating process, the use of additives to prevent metal precipitation in the impregnated solutions is not required. Furthermore, the impregnation permits better penetration of the Group VI-B elements into the porous catalyst support.

The catalyst described hereinabove offers improved dispersion of the catalytically active elemental moieties impregnated onto the support. The properties of the catalyst are directly related to the dispersion of the active elements on the surface of the support.

The dispersion of the elements on the catalyst support can be measured by X-ray photo-electron spectroscopy (XPS). The signals emitted during XPS enable the quantity of elements on the catalyst surface to be determined and calculated.

The XPS technique consists of exciting the atoms of the material by means of X-rays and measuring the energy spectrum of the electrons emitted by photoemission. As the X-rays penetrate only a few angstroms of the catalytic support, the spectrum obtained is a measure of the quantity of the element present on the surface of the catalyst. The XPS measurements are made using a Leybold LHS-10 apparatus which consists of an X-ray source, an energy analyzer and a detector system. The apparatus is operated at an energy level of $h\nu = 1253.6$ eV supplied by a magnesium cathode (Mg K) drawing 300 watts at a step energy of 50 eV. Carbon (1s, 285 eV) and aluminum (2p, 74.8 eV) are taken as standards for calculating the bonding energies.

The surface dispersion of the metals is determined by measuring the total area for the XPS signal intensity peak corresponding to each of the metals loaded onto the catalyst. The signal band strength ratio for each element is calculated by dividing the area of the peak for the particular element by the combined area of the particular element and the area of the aluminum peak. For example, if the dispersion of cobalt on the support is to be determined, the area of the cobalt peak, represented by Co, is divided by the combined area of the cobalt peak and the aluminum peak, represented by Al, the general formula is: (Co)/(Co+Al).

The signal band strength ratios for the metals on the support in a preferred embodiment of this invention are about 3 to about 9 for the Group VI-B element on the catalyst, i.e., Group VI-B/(Group VI-B+Al); about 4 to about 12 for the Group VIII first transition series element loaded on the catalyst, i.e., Group VIII (first transition series)/[Group VIII (first transition series)+Al]; about 0.01 to about 3, preferably about 0.1 to about 3, for the Group VIII (second transition series) element on the catalyst, i.e., Group VIII (second transition series)/[Group VIII (second transition series)+Al]; and about 0.3 to about 10, pfeferably about 1 to about 10, for the titanium on the surface of the catalyst, i.e., Ti/(Ti+Al).

Prior to use, the oxide precursor catalyst is activated by reduction-sulfidation reactions which convert the acidic, supported metals into metallic sulfides which are the catalytically active species during the hydrotreatment. The sulfidation process takes place in an atmosphere of $H_2S/H_2$. The atmosphere contains about 1% to about 10% by weight sulfur. The sulfidation process takes place at atmospheric pressure and at a temperature of about 200° C. to about 450° C.

The sulfidation process, and thus the activation of the catalyst, may also occur in a two phase, gas-liquid mixture of $H_2$ and a vacuum gas oil or a light oil containing about 0.5% to about 5% by weight of sulfur from a sulfiding agent (spiking agent) such as, e.g. dimethyl sulfide, dimethyl disulfide, carbon disulfide, and the like. This alternate sulfidation process is carried out at a pressure of about 200 psig to about 600 psig, and a temperature of about 230° to about 400° C., with stepwise temperature increases of about 15° C. to about 30° C. per hour. The volumetric space velocity of the gas-liquid mixture during sulfidation is about 1 to about $3h^{-1}$.

The petroleum hydrocarbon feedstock (virgin and cracked), preferably is first treated in a hydrotreating stage in order to decrease its sulphur and nitrogen content, then contacted with the catalyst, under hydrocracking conditions, and while at least 30 percent by weight of the feedstock is in vapor phase. For diesel fuel production, it is sufficient that at least 30 percent by weight of the feedstock is in vapor state. For jet fuel production, preferably at least about 50 percent by weight of the feedstock is in vapor state. The contacting is effected for a time period sufficient to convert at least a portion of the petroleum hydrocarbon feedstock into diesel fuel or jet fuel, as the case may be, and to reduce the aromatics content thereof.

In the reactor, preferably at least about 60 percent of the reactor void volume is occupied by a gaseous mixture of hydrogen and vaporized feedstock. More preferably, at least about 80 percent of the reactor void volume is occupied by such gaseous mixture.

In the production of high quality diesel fuel or jet fuel from a cracked gas oil as the feedstock, the cracked gas oil preferably is first pre-treated in a mixed catalyst bed to reduce the sulfur and nitrogen content thereof as mentioned above. A desirable pre-treatment for this purpose is described in U.S. Pat. No. 5,009,768 to Galiasso et al. However, other convenient desulfurization and denitrogenation processes can be utilized as well. It is also desirable to remove from the cracked gas oil at least a portion of the hydrocarbon fraction thereof that boils below about 30° C., i.e., the $C_1$ to $C_2$ hydrocarbon fraction, to minimize the reactor volume requirements for the subsequent hydrocracking and hydrogenation stage or stages.

Typical such cracked feedstock contains initially above about 40 volume percent, usually about 40 to about 70 volume percent aromatics, about 0.1 to about 0.3 weight percent sulfur, and about 600 parts per million, by weight, of nitrogen. No metals such as vanadium or nickel are present. In general, the process flow during hydrocracking includes the mixing of a hydrogen-rich gas with the feedstock, heating of the resulting mixture, and contacting with a trimetallic hydrocracking catalyst in a reactor, usually a fixed bed reactor, under a predetermined hydrogen partial pressure and at the desired hydrocarbon vapor contents. Another possibility is to heat the hydrogen gas and the feedstock independently, and then mixing them. Hydrocracking processes usually can be operated at a temperature in the range of about 300° C. to about 460° C. and at a pressure in the range of about 100 psig to about 2,000 psig, sometimes as high as 3,000 psig.

The reactor or seriatim reactors in which the trimetallic hydrocracking catalyst can be used preferably is operated at a temperature of about 340° C. to about 410° C., more preferably at about 350° C. to about 390° C., a total pressure of about 900 psig to about 2,000 psig, more preferably about 1,000 psig to about 1,800 psig, and at a liquid hourly space velocity (LHSV) of about 0.1 $h^{-1}$ to about 2 $h^{-1}$, and more preferably about 0.25 $h^{-1}$ to about 1 $h^{-1}$. The specific process conditions and the number of reactors or hydrocracking stages to be utilized in any given instance depends to a large extent on the desired end products as will be illustrated in greater detail hereinbelow. The process temperature in the reactors can be the same or different, again depending on the desired end products.

The hydrogen-to-hydrocarbon feedstock charge ratio for a hydrocracking process using a tri-elemental catalyst preferably is about 500 $Nm^3/m^3$ to about 3,000 $Nm^3/m^3$, more preferably about 1,000 $Nm^3/m^3$ to about 2,500 $Nm^3/m^3$, again depending upon the desired end product and its aromatic content. ($Nm^3 = m^3$ @ STP). The above conditions provide an optimum environment for operation utilizing the present catalyst characterized hereinabove.

In yet another process embodiment, utilizing somewhat lower hydrogen/hydrocarbon ratios, the hydrocracking and hydrogenation process utilizing a tri-elemental catalyst as described hereinabove can be carried out at a temperature in the range of about 360° C. to about 380° C., a total reactor pressure in the range of about 750 psig to about 1,000 psig, a liquid hourly space velocity in the range of about 0.1 $h^{-1}$ to about 2 $h^{-1}$, and a hydrogen to liquid hydrocarbon feedstock ratio in the range of about 400 $Nm^3/m$ to about 900 $Nm^3/m$.

The following examples are offered as illustrations of the concepts described herein. Nothing in these Examples is to be construed as a limitation to the scope of the invention except within the limits of the claims appended hereto.

EXAMPLE 1

Hydrocracking Using a Supported NiWRu Catalyst

Supported catalysts having the pore diameter distribution as given in Table I, above, and the respective compositions set forth in Table II, below, were used under typical hydrocracking conditions with previously hydrotreated cracked feedstock. The process conditions for hydrocracking in both instances were as follows:

Reaction temperature: 380° C.
Total pressure: 800 psig
Space velocity (LHSV): 0.55 $h^{-1}$
$H_2$/Hydrocarbon ratio: 1000 $Nm^3/m^3$
$H_2S$ partial pressure @ inlet (psi): 0
$NH_3$ partial pressure @ inlet (psi): 0

The process flow diagram is shown in FIG. 1, starting with the hydrotreating stage and followed by separation and gas phase purification to provide the hydrogen sulphide and ammonia partial pressures at the hydrocracking stage.

TABLE II

| | Catalyst Composition | | |
|---|---|---|---|
| | Supported W—Ni—Ru Catalyst | Supported W—Ni Catalyst | Supported W—Ni—Pd Catalyst |
| $WO_3$, wt.-% | 20 | 20 | 20 |
| NiO, wt.-% | 6 | 6 | 5 |
| $RuO_2$, wt.-% | 0.6 | — | — |
| $PdO_2$, wt.-% | — | — | 1 |
| $TiO_2 + Al_2O_3$, wt.-% | 73.4 | 74 | — |
| $SiO_2 + Al_2O_3$, wt.-% | — | — | 74 |

| Properties of Feedstock A: | |
|---|---|
| Degrees A.P.I.: | 26.0 |
| Sulfur, wt.-%: | 0.394 |
| Nitrogen, ppm: | 460 |
| 370° C. + fraction, vol.-%: | 42 |

-continued

| Properties of Feedstock A: | |
|---|---|
| Aromatics, vol. %: | 55 |

Results from the foregoing treatment are compiled in Table III, below

TABLE III

| | Processing Results | | |
|---|---|---|---|
| | HDS[1] % | MHC[3] % | AS[4] % |
| W—Ni—Ru Catalyst | 93.4 | 23.8 | 22.6 |
| Supported W—Ni Catalyst | 84.7 | 20.0 | 13.0 |
| Supported W—Ni—Pd Catalyst | 80.0 | 18.0 | 15.0 |

[1]Hydrodesulfurization activity
[3]Hydrocracking activity
[4]Aromatic maturation activity The foregoing data demonstrate the positive effect of ruthenium, incorporated as described hereinabove, in combination with the Ti-Al support on hydrodesulfurization, hydrocracking, as well as reduction of aromatics under the herein contemplated processing conditions.

EXAMPLE 2

Hydrocracking Using A Catalyst Prepared By Two- or Three- Stage Impregnation

| Feedstock A | |
|---|---|
| Reaction Temperature: | 380° |
| Total Pressure: | 800 psig |
| Space Velocity | 0.55 h$^{-1}$ |
| H$_2$/Hydrocarbon | 1000 Nm$^3$/m$^3$ |
| H$_2$S Partial pressure @ inlet | 0 psi |
| NH$_3$ partial pressure @ inlet | 0 psi |

TABLE IV

| | Catalyst Composition | | | |
|---|---|---|---|---|
| | W—Ni—Ru Catalyst | | | Ni—W |
| Catalyst Composition | Two-Stage Preparation | Three Stage Preparation | Catalyst Ni—W | Catalyst + Ru* |
| WO$_3$ | 20 | 20 | 20 | 19.9 |
| NiO | 6 | 6 | 6 | 5.98 |
| RuO$_2$ | 0.6 | 0.58 | — | 1 |
| TiO/Al$_2$O$_3$ | 73.4 | 73.6 | 74 | 73.8 |

*Prepared by impregnation of Ru on NiW Catalyst using methodology described herein.

TABLE V

| | Catalyst Dispersion (XPS) | | | |
|---|---|---|---|---|
| | W—Ni—Ru Catalyst | | | Ni—W |
| Catalyst Composition | Two-Stage Preparation | Three Stage Preparation | Catalyst Ni—W | Catalyst + Ru |
| W/Me | 8 | 7.7 | 3.0 | 4.0 |
| Ni/Me | 5 | 4.9 | 3.5 | 3.0 |
| Ti/Me | 6.5 | 6.4 | 3.0 | 2.8 |

Results from the foregoing treatment are compiled in Table VI, below.

TABLE VI

| | Catalyst Activity With Feedstock A | | |
|---|---|---|---|
| | Activity | | |
| Catalyst | HDS % | MHC % | AS % |
| W—Ni—Ru Catalyst Two Stage Impr. | 93.4 | 23.8 | 22.6 |
| W—Ni—Ru Catalyst Three Stage Impr. | 92.0 | 25.0 | 28.5 |
| W—Ni Supported | 84.7 | 20.0 | 13.0 |

TABLE VI-continued

| | Catalyst Activity With Feedstock A | | |
|---|---|---|---|
| | Activity | | |
| Catalyst | HDS % | MHC % | AS % |
| Catalyst Supported W—Ni Catalyst Catalyst + Ru* | 87.0 | 17.0 | 18.0 |

*Prepared by impregnation of Ru on NiW Catalyst using methodology described herein.

The foregoing data demonstrate the positive effect of ruthenium, whether added in a two- or three-stage impregnation so as to maximize dispersion of the metals. Ruthenium added to "standard" prepared catalyst in a similar manner does not provide the same performance.

EXAMPLE 3

Effect Of Operating Conditions

The effect of operating conditions on the trimetallic catalyst were studies using Feedstock A. The process conditions are presented in Table VII, below.

TABLE VII

| | Process Conditions | | | |
|---|---|---|---|---|
| | W—Ni—Ru/Ti—Al | | W—Ni/ Ti—Al | W—Ni + Ru*/ Ti—Al |
| Conditions | Two Stage | Three Stage | Two Stage | Two Stage |
| Gas Phase, vol.-% (Based On Void Volume) | 65 | 65 | 48 | 48 |
| Temperature of Reaction, °C. | 380 | 370/390 | 380 | 380 |
| Total Reactor Pressure, psig | 1500 | 1500 | 2200 | 2200 |
| Space Velocity, hr$^{-1}$ | 0.5 | 0.5 | 0.5 | 0.5 |
| H$_2$/ Hydrocarbon, Nm$^3$/m$^3$ | 2000 | 2000 | 800 | 800 |
| H$_2$S Part. Press., psi | 1 | 1 | 1 | |

*Prepared by impregnation of Ru on NiW Catalyst using methodology described herein.

Results from the foregoing treatment are compiled in Table VIII, below.

TABLE VIII

| | Process Results | | | | |
|---|---|---|---|---|---|
| | Hydrocracking % V/Wt | | | | AS |
| Process | JetFuel | Diesel | Gasol. | C$_1$-C$_4$ | % |
| W—Ni—Ru/Ti—Al Two Stage | 20 | 55 | 5 | 5 | 50 |
| W—Ni—Ru/Ti—Al Three Stage | 40 | 40 | 7 | 6 | 45 |
| W—Ni/Ti—Al Two Stage | 20 | 30 | 12 | 8.5 | 30 |
| W—Ni—Ru*/Ti—Al Two Stage | 25 | 35 | 10 | 7.0 | 40 |

*Prepared by impregnation of Ru on NiW Catalyst using methodology described herein.

Figure 2:
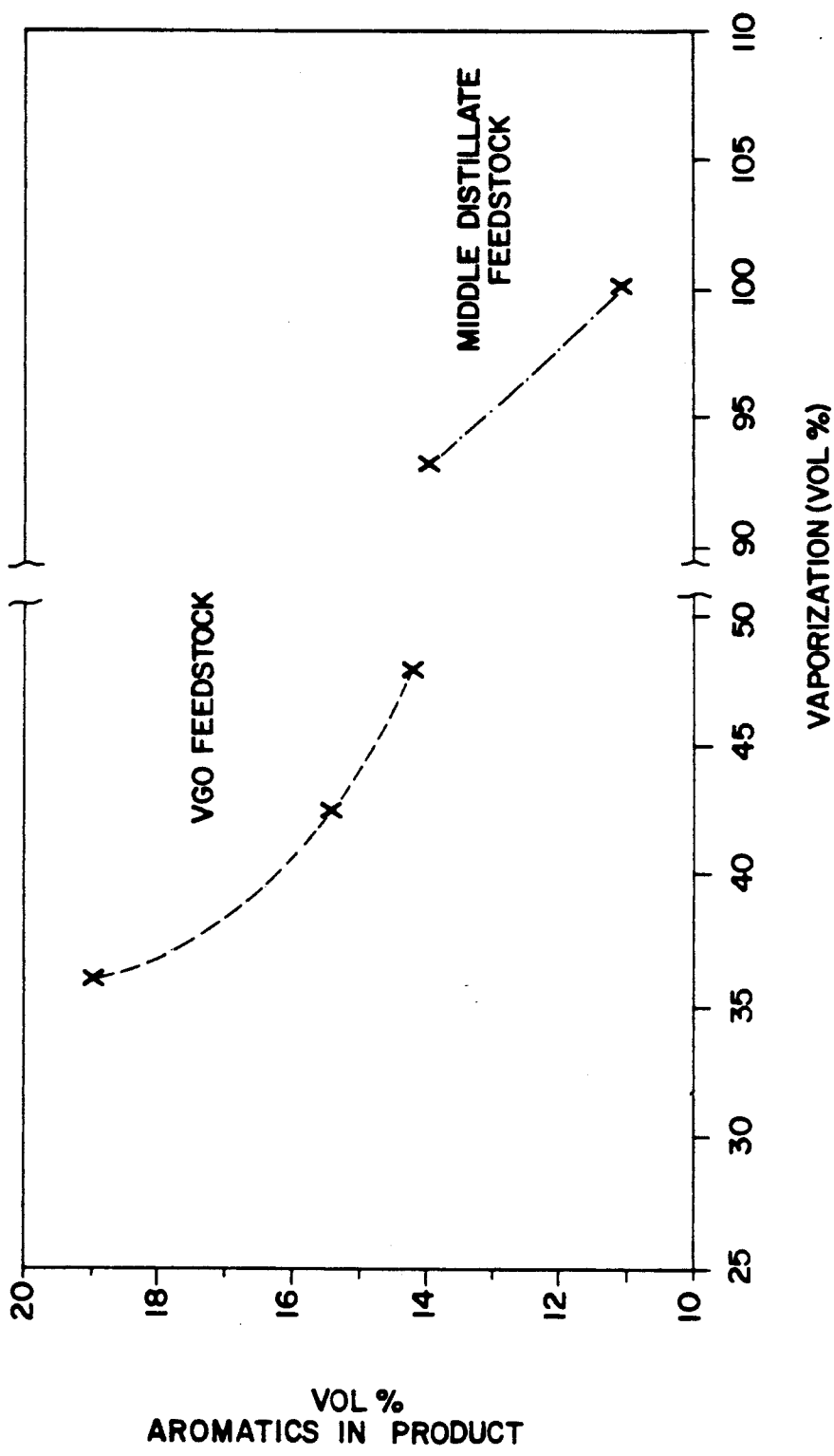
FIG. 2 is a graph showing the effect of reactor vapor content on aromatic saturation (hydrogenation) by vacuum gas oils and middle distillates as feedstocks in a two-stage process.

These data demonstrate the flexibility of the present process to produce relatively high or relatively low ratio of jet fuel/diesel fuel as desired. The data also demonstrate the relatively higher selectivity of the trimetallic catalyst in comparison with others under the present process conditions even at higher total process pressure. The difference in gasoline and gas formation is particularly noteworthy. FIG. 2 illustrates the beneficial effect of vaporization on the aromatics saturation using vacuum gas oil (VGO) as the feedstock in a two stage process with W-Ni-Ru/Ti-Al catalyst under the conditions shown in Table VII, above.

EXAMPLE 4

Effect Of Hydrogen Sulphide Partial Pressure

The effect of $H_2S$ partial pressure on aromatic content of the product was investigated using the following feedstocks:

Feedstock B:
 30% of LCCO (Light catal. gas oil)
 40% of HKGO (Heavy coker gas oil)
 30% of HVGO (Heavy vacuum gas oil)

Feedstock C:
 40% of HKGO
 50% of HVGO
 10% of DAO (Desphalted oil)

TABLE IX

Hydrocracking Feed Properties
(After Hydrotreating in accordance with U.S. Pat. No. 5,099,768)

| Feed Properties | Feedstock B | Feedstock C |
|---|---|---|
| Sulphur, ppm | 1300 | 1200 |
| Nitrogen, ppm | 300 | 390 |
| Aromatic, vol.-% | 55 | 53 |
| Paraffins, vol.-% | 5 | 7 |
| Boiling Range, °C./vol.-% | 250-500/100% | 280-500/95% |

TABLE X

Hydrocracking Operating Conditions

Figure 3:
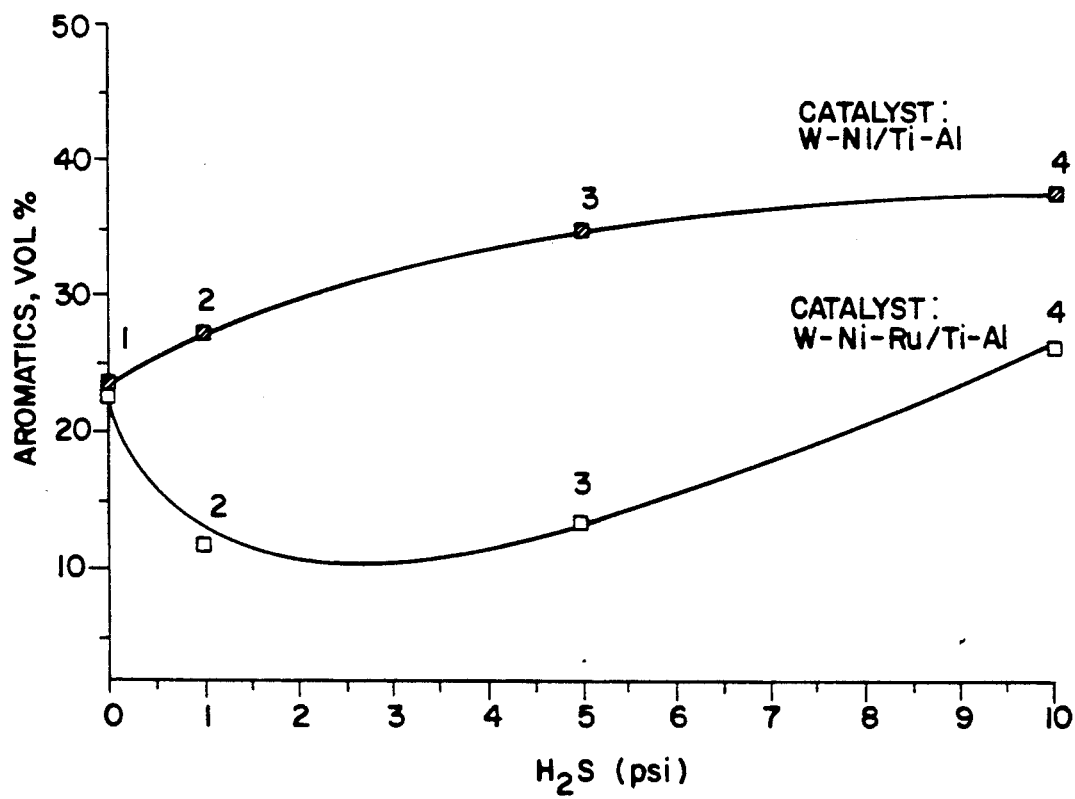
FIG. 3 is a graph showing aromatic hydrogenation as a function $H_2S$ partial pressure.
Figure 4:
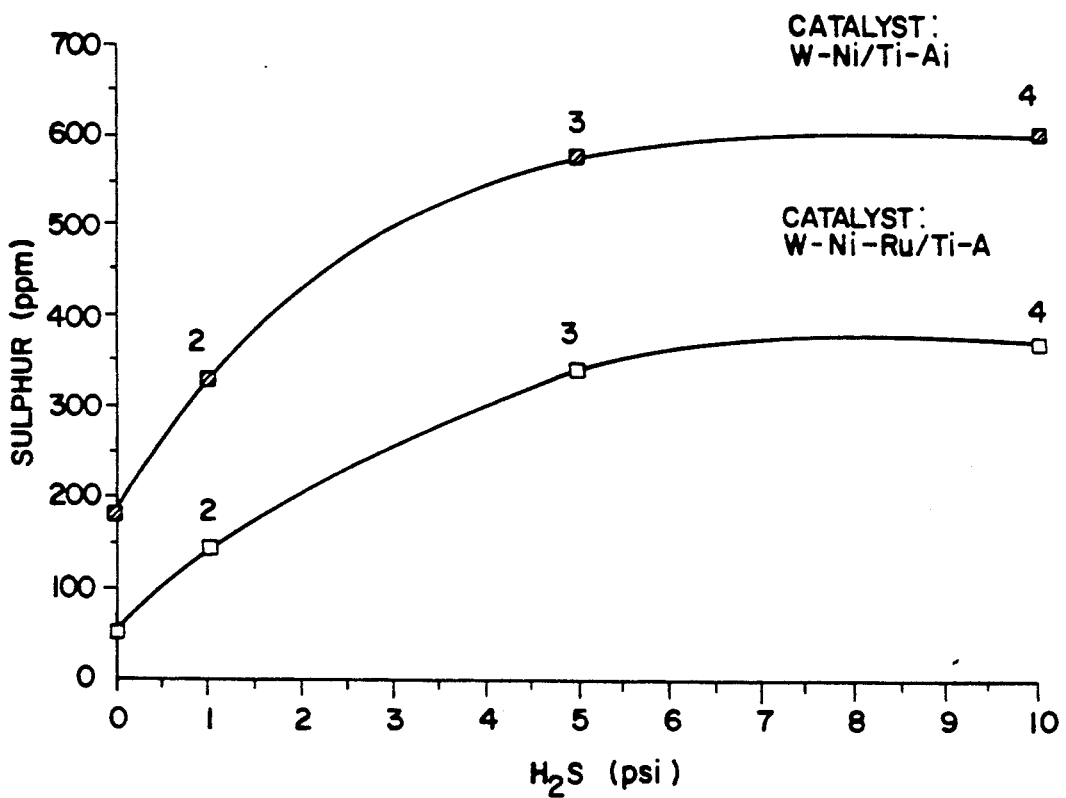
FIG. 4 is a graph showing hydrodesulphurization as a function of H₂S partial pressure.

| Process Parameter | Data Points In FIGS. 3 & 4 | | | |
|---|---|---|---|---|
| | 1 | 2 | 3 | 4 |
| Pressure, psig | 1800 | 1800 | 1800 | 1800 |
| Space Velocity, $h^{-1}$ | 0.5 | 0.5 | 0.5 | 0.5 |
| $H_2S$ Part.Press., psi | 0 | 1 | 5 | 10 |
| Gas Phase, vol.-% | 60 | 60 | 60 | 60 |
| No. of Reactors | One | One | One | One |

FIGS. 3 and 4 depict the effect of hydrogen sulphide on aromatic hydrogenation and sulphur removal for Feedstock B, when the present process is used with a trimetallic or bimetallic catalyst. An unexpected effect of the present process is clearly demonstrated for better aromatic saturation as well as sulfur removal.

The effect is the same for other feedstocks such as Feedstock C. Table XI, below, shows the observed results.

TABLE XI

Processing Results
See Conditions Table X

| Feed | 1 | 2 | 3 |
|---|---|---|---|
| Aromatics In Product, Vol.-% | | | |
| Feedstock B | 21 | 11 | 12 |
| Feedstock C | 25 | 15 | 16 |
| Hydroconversion, Vol.-% | | | |
| Feedstock B | 25 | 23 | 23 |
| Feedstock C | 29 | 25 | 25 |

These examples demonstrate that the use of the trimetallic catalyst in the present process can produce selective hydrocracking to diesel and jet fuel from cracked feedstock. High quality diesel production is demonstrated in Example 5, below.

EXAMPLE 5

High Quality Diesel Production

Feedstock B (Example 4) was processed under the following conditions:

| Pressure, psig | 1800 |
|---|---|
| Space velocity, $hr^{-1}$ | 0.5 |
| $H_2S$ partial press, psi | 1 |
| Gas phase, vol.-% | 60 |
| No. of reactors | 1 |

Properties of the obtained diesel fuel are compiled in Table XII, below.

TABLE XII

Diesel Fuel Properties

| Property | W—Ni—Ru/ Ti—Al Catalyst | W—Ni/Ti—Al Catalyst |
|---|---|---|
| Sulphur, ppm | 50 | 300 |
| Nitrogen, ppm | 10 | 100 |
| Aromatic, vol.-% | 15 | 25 |
| Cetane Index | 54 | 40 |
| Cloud Point, °C. | 25 | 0 |

The observed difference in cloud point, associated with the amount of isoparaffinic material in the diesel fraction, is particularly noteworthy.

We claim:

1. A hydrocracking and hydrogenation process suitable for a petroleum hydrocarbon feedstock that contains sulfur, nitrogen, and aromatic components, which process comprises:

contacting said hydrocarbon feedstock, under hydrocracking conditions, with a particulate catalyst constituted by a porous support comprising alumina and titania wherein the alumina is present in an amount in the range of about 95 weight percent to about 70 weight percent, and wherein the titania is present in an amount of about 5 to about 30 weight percent, both based on the weight of the support, and by a catalytically active tri-elemental phase on the support consisting essentially of a transition element of Group VI-B of the Periodic Table of Elements, a transition element of the first transition series of Group VIII of the Periodic Table of Elements, and a transition element of the second transition series of Group VIII of the Periodic Table of Elements; said porous support having a surface area in the range of about 130 $m^2$/gram to about 300 $m^2$/gram and at least about 95 percent of the pores thereof having a pore diameter in the range of about 20 Angstroms to about 500 Angstroms; and said Group VI-B transition element being present in an amount in the range of about 6 weight percent to about 30 weight percent, expressed as weight of the corresponding oxide and based on the weight of the catalyst, said Group VIII first transition series element being present in an amount in the range of about 2 weight percent to about 10 weight percent, expressed as weight of the corresponding oxide and based on the weight of the catalyst, and said Group VIII second transition series element being present in an amount in the range of about 0.01 weight percent to about 1 weight percent, based on the weight of the catalyst, for a time period sufficient to convert at least a portion of said cracked petroleum hydrocarbon feedstock into a product having relatively lower aromatic content.

2. The hydrocracking and deep hydrogenation process in accordance with claim 1 wherein said hydrocracking conditions include a temperature in the range of about 360° C. to about 380° C., a pressure in the range of about 750 to about 1,500 psig, a liquid hourly space velocity in the range of about $0.1\ h^{-1}$ to about $2\ h^{-1}$ and a hydrogen-to-hydrocarbon feedstock ratio in the range of about 400 $Nm^3/m^3$ to about 900 $Nm^3/m^3$.

3. A hydrocracking and hydrogenation process suitable for a petroleum hydrocarbon feedstock which process comprises:

contacting said cracked hydrocarbon feedstock, having an aromatic content above about 40 percent by volume, in a reactor, under hydrocracking conditions wherein a mixture of hydrogen gas and hydrocarbon vapor occupies at least 60 percent of the reactor void volume, with a particulate catalyst constituted by a porous support comprising alumina and titania; wherein the alumina is present in an amount in the range of about 95 weight percent to about 70 weight percent, and wherein the titania is present in an amount of about 5 to about 30 weight percent, both based on the weight of the support, and by a catalytically active tri-elemental phase on the support consisting essentially of a transition element of Group VI-B of the Periodic Table of Elements, a transition element of the first transition series of Group VIII of the Periodic Table of Elements, and a transition element of the second transition series of Group VIII of the Periodic Table of Elements; said porous support having a surface area in the range of about 130 $m^2$/gram to about 300 $m^2$/gram and at least about 95 percent of the pores thereof having a pore diameter in the range of about 20 Angstroms to about 500 Angstroms; and said Group VI-B transition element being present in an amount in the range of about 6 weight percent to about 30 weight percent, expressed as weight of the corresponding oxide and based on the weight of the catalyst, said Group VIII first transition series element being present in an amount in the range of about 2 weight percent to about 10 weight percent, expressed as weight of the corresponding oxide and based on the weight of the catalyst, and said Group VIII second transition series element being present in an amount in the range of about 0.01 weight percent to about 1 weight percent, based on the weight of the catalyst, for a time period sufficient to convert at least a portion of said cracked petroleum hydrocarbon feedstock into a petroleum product having an aromatic content less than about 20 percent by volume.

4. The hydrocracking and hydrogenation process in accordance with claim 3 wherein at least about 80 percent of the reactor void volume is occupied by a mixture of hydrogen gas and hydrocarbon vapor.

5. The hydrocracking and hydrogenation process in accordance with claim 3 wherein said hydrocracking conditions include a temperature in the range of about 350° C., a pressure in the range of about 1,000 to about 1,800 psig, a liquid hourly space velocity in the range of about $0.25\ h^{-1}$ to about $1\ h^{-1}$, and a hydrogen-to-hydrocarbon feedstock ratio in the range of about 1,000 $Nm^3/m^3$ to about 2,500 $Nm^3/m^3$.

6. The hydrocracking and hydrogenation process in accordance with claim 3 wherein said hydrocracking conditions include a temperature in the range of about 340° C. to about 410° C., a pressure in the range of about 900 psig to about 2,000 psig, a liquid hourly space velocity of about $0.1\ h^{-1}$ to about $2\ h^{-1}$, and a hydrogen-to-hydrocarbon feedstock ratio in the range of about 500 $Nm^3/m^3$ to about 3,000 $Nm^3/m^3$.

7. The hydrocracking and hydrogenation process in accordance with claim 3, where at least about 80 volume percent of the reactor void volume is occupied by a gaseous mixture of hydrogen and vaporized feedstock.

8. The hydrocracking and hydrogenation process in accordance with claim 3 wherein at reactor inlet hydrogen sulfide partial pressure is about 1 to about 10 psi and nitrogen partial pressure is about 0.01 psi to about 0.1 psi.

9. The hydrocracking and hydrogenation process in accordance with claim 1 wherein said feedstock contains aromatic components in an amount of about 40 to about 70 volume percent.

10. The hydrocracking hydrogenation process in accordance with claim 3 wherein said particulate catalyst has the following chemical surface composition as measured by XPS technique: Group VI-B/(Group VI-B+Al) is about 3 to about 9, Group VIII (first transition series) / [(Group VIII (first transition series)+Al] is about 4 to about 12, Group VIII (second transition series) / [Group VIII (second transition series+Al] is about 0.1 to about 3, and Ti/(Ti+Al) is about 0.3 to about 10.

* * * * *